W. A. RIGAL.
AUTO TIRE LOCK.
APPLICATION FILED DEC. 20, 1920.

1,384,487. Patented July 12, 1921.

INVENTOR
W. A. Rigal
BY Munn & Co.
ATTYS.

UNITED STATES PATENT OFFICE.

WALDO A. RIGAL, OF CHICAGO, ILLINOIS.

AUTO-TIRE LOCK.

1,384,487.     Specification of Letters Patent.     Patented July 12, 1921.

Application filed December 20, 1920. Serial No. 431,944.

*To all whom it may concern:*

Be it known that I, WALDO A. RIGAL, a citizen of the United States, and a resident of Chicago, in the county of Cook and State of Illinois, have invented a new and useful Improvement in Auto-Tire Locks, of which the following is a full, clear, and exact description.

My invention relates to improvements in auto tire locks, and it consists in the combinations, constructions and arrangements herein described and claimed.

It is well known that a considerable loss to motorists occurs on account of theft or accidental displacement of spare tires ordinarily mounted on tire carriers secured to automobiles.

It is therefore an object of my invention to provide a simple, relatively inexpensive, and thoroughly effective device for securing an automobile tire in adjusted position on a tire carrier or the like.

A further object of my invention is to provide a device of the type described that has members adapted to encircle the rim of a tire carrier and the carrier mounted thereon and is provided with a locking mechanism for maintaining the encircling members in operative position, wherefore theft or unauthorized removal of the tire cannot be accomplished without breaking the locking device.

A further object of my invention is to provide in a device of the type described a novel form of permutation lock.

A further object of my invention is to provide a device of the type described that is provided with adjustable means for engaging the adjacent portions of the encircled tire and tire carrier, wherefore play between the device and the work engaged is prevented and the device is rendered suitable for use with tires of varying sizes.

Other objects and advantages will appear in the following specification, and the novel features of the invention will be particularly pointed out in the appended claims.

My invention is illustrated in the accompanying drawings, forming part of this application, in which—

Figure 1:
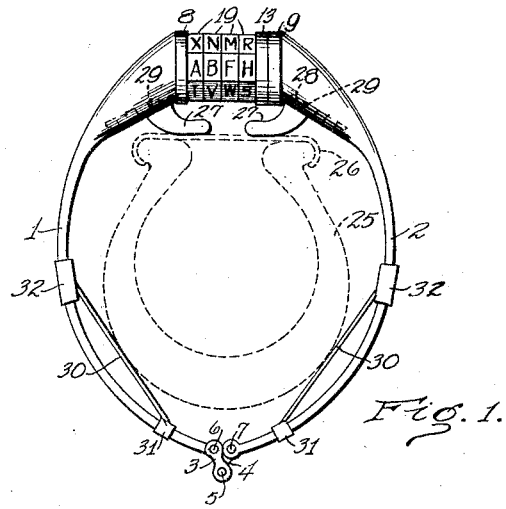
Figure 1 is a view showing the device operatively applied.
Figure 2:
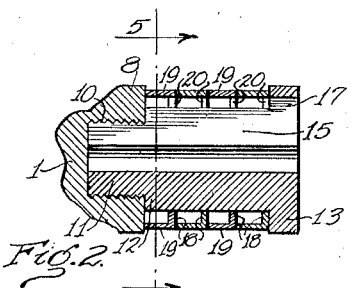
Fig. 2 is a longitudinal section through a fragmentary portion of the device.
Figure 4:
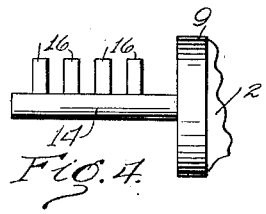
Fig. 4 is a detail of still another fragmentary portion of the device.
Figure 3:
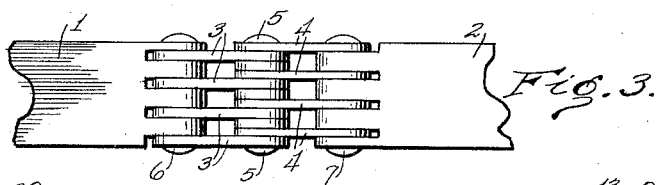
Fig. 3 is a detail of another fragmentary portion of the device.
Figure 5:
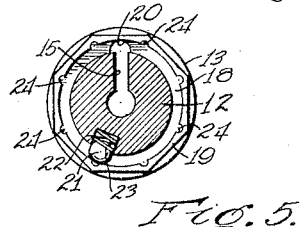
Fig. 5 is a section along the line 5—5 of Fig. 2.
Figure 6:
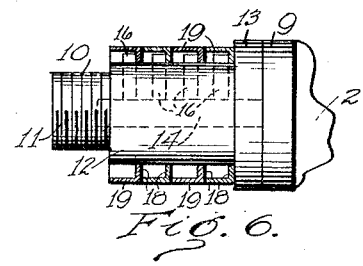
Fig. 6 is a detail of the locking mechanism embodied in the device.
Figure 7:
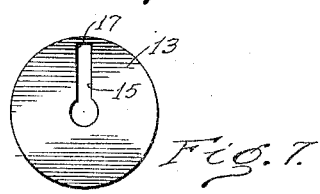
Fig. 7 is an end view of the portion of the device shown in Fig. 2.

In carrying out my invention, I provide a pair of substantially semi-annular arms 1 and 2. Links 3 and 4 are pivotally connected at 5 and are pivoted at 6 and 7, respectively, to corresponding ends of the arms 1 and 2. The arms 1 and 2 are enlarged adjacent their free ends, as shown, and formed to provide heads 8 and 9.

The locking mechanism of the device is carried by the heads 8 and 9. To this end the head 8 has a threaded central socket 10 adapted to receive the threaded reduced end portion 11 of a sleeve 12. The sleeve 12 is formed with a disk head 13 at the outer end thereof that is arranged to contact with the head 9 when the arms 1 and 2 are in the position shown in Fig. 1. The sleeve 12 is designed to receive a locking bolt 14 that is integral with the head 9 and extends laterally thereof. It is therefore provided with a longitudinal slot 15 through its wall adapted to receive alined spaced apart lateral lugs 16 carried by the locking bolt. The lugs 16 have a length greater than the thickness of the wall of the sleeve 12, and a suitable slot 17 is consequently provided through the head 13 in alinement with the slot 15 to permit the lugs 16 to enter the latter. Obviously, the ends of the lugs 16 will project beyond the wall of the sleeve 12.

Mounted on the sleeve 12 between the heads 8 and 13 are a plurality of rotatable alined tumblers, the number thereof being determined by the number of lugs 16 carried by the locking bolt. Each of the tumblers consists of a disk portion 18 and an integral cylindrical portion 19 extending laterally of the disk portion at the outer edge thereof. The disk portions 18 are each formed with a notch 20 therein adapted to receive the portions of the lugs 16 that projects beyond the wall of the sleeve 12.

The peripheral wall of the cylindrical portion 19 is octagonal in the form of the device illustrated, and each side thereof bears an inscribed character. The characters of the several sides differ from each other and the several tumblers may therefore be adjusted relative each other.

From the foregoing description of the various parts of the device, the operation thereof may be readily understood. The combination being known the tumblers are rotated until the notches 20 are in registration and alined with the longitudinal slot 15. Obviously, the locking bolt 14 carrying the lateral lugs 16 can now be inserted in the sleeve 12 and withdrawn therefrom at will. When the tumblers are rotated and the locking bolt is disposed within the sleeve 12, the walls of the disk portions 18 will engage with the lugs 16 to prevent the withdrawal of the locking bolt 14 until the tumblers are adjusted in accordance with a known combination. The combination can be changed at will by interchanging the tumblers. Balls 21 rest upon and are thrust outwardly by coil springs 23 in the wall of the sleeve 12 and engage with the inner wall of the cylindrical portions of the several tumblers to prevent free rotation thereof and engage with spaced apart notches 24 to maintain the tumblers in adjusted position.

Referring particularly to Fig. 1, it will be noted that the device is operatively applied by arranging the curved arms 1 and 2 to encircle an automobile tire casing 25 and the rim upon which the same is mounted. The locking mechanism of the device is then operated in the manner hereinbefore described to lock the enlarged portions of the arms 1 and 2 together. Spacing members each having a curved body portion 27 and an integral threaded shank 28 engaging a selected one of the threaded sockets 29 in the inner surface of the enlarged portions of the arms 1 and 2 contact with the adjacent portions of the rim 26 and also serve to guard the locking mechanism, wherefore the tumblers can be operated at any time. Since a plurality of the threaded sockets 29 are provided, the spacing members may be positioned to render the device suitable for engaging tire casings of varying sizes. Additional auxiliary spacing members are provided and have the forms of longitudinal bars 30 having spring qualities. A pair of these bars are provided in the device and are arranged, as shown, each having clips 31 and 32 at the ends thereof encircling the arm 1 or the arm 2 and slidable therealong. The inherent resiliency of the bars 30 tends to maintain the same in the positions shown, but movement of the same toward the arms 1 and 2 under stress is yieldingly permitted when tires of a larger size than that illustrated are encircled by the arms 1 and 2. It is to be observed that the arms 1 and 2 are connected by the links 3 and 4 and in consequence may be relatively moved so that the co-acting locking elements carried at the free ends of the arms may be readily adjusted to occasion the locking of the arms together under adverse service conditions, as for instance, when the arms are encircling over-sized members. Furthermore, since the arms 1 and 2 can be relatively adjusted, the use of a locking bolt of relatively great length is possible and a locking mechanism of maximum strength for a given size is thus provided.

While I have described the device as being designed primarily for securing a spare tire in position on a tire carrier and for preventing the theft and accidental displacement thereof, it is obvious that the device may be used in the same manner to prevent loss of a tire mounted on a wheel of a vehicle.

I claim:

1. A device of the character described comprising a pair of substantially semi-annular arms, a plurality of links connecting said arms at one end, one of said arms being provided with a locking bolt and the other of said arms being provided with a lock casing adapted to receive said bolt, and combination controlled means co-acting with said lock casing to control the movement of said locking bolt relative to the lock casing.

2. A device of the character described comprising a pair of substantially semi-annular arms hingedly fastened together at one end and provided with combination controlled co-acting means at the other end thereof for locking said arms in position to transversely encircle a tire carrier rim and the tire mounted thereon, and relatively adjustable means carried by said arms for constantly engaging adjacent surfaces of said rim and said tire to maintain the same in adjusted position relative said arms.

3. A device of the character described comprising a pair of curved arms hingedly connected at one end, said arms being enlarged at their free ends to provide normally alined heads, one of said heads being formed with a threaded socket in the face thereof and the other of said heads being provided with an integral locking bolt extending from the approximate center thereof toward said first-named head, said bolt being provided with a plurality of spaced apart alined laterally extending lugs, a sleeve having a threaded reduced portion disposed in said socket, said sleeve being formed with a central opening communicating with a longitudinal slot through its wall and adapted to receive said locking bolt, and means mounted on said sleeve and operable to engage with said lugs to selectively prevent or permit the withdrawal of said locking bolt from said sleeve.

4. A device of the character described comprising a pair of curved arms hingedly connected at one end, said arms being enlarged at their free ends to provide normally alined heads, one of said heads being formed with a threaded socket in the face thereof and the other of said heads being provided with an integral locking bolt extending from the approximate center thereof toward said first named head, said bolt being provided with a plurality of spaced apart alined laterally extending lugs, a sleeve having a threaded reduced portion disposed in said socket, said sleeve being formed with a central opening communicating with a longitudinal slot through its wall and being adapted to receive said locking bolt, a plurality of rotatable tumblers mounted on said sleeve, each tumbler having a disk portion positioned to engage the lugs of said locking bolt when the latter is in locked position, each of said disk portions being provided with a radially extending notch in its wall adapted to register with the longitudinal slot in said sleeve when said tumbler is in adjusted position relative to the latter, whereby said locking bolt can then be inserted within and withdrawn at will from said sleeve, said tumblers being provided with series of characters on their peripheral surfaces.

5. In a device of the character described, a pair of curved arms hingedly connected at one end, said arms being enlarged at their free ends to provide normally alined heads, one of said members being formed with a threaded socket in the face thereof and the other of said members being provided with an integral locking bolt extending toward said first named head, said bolt being provided with a plurality of spaced apart alined laterally extending lugs, a sleeve having a threaded reduced portion disposed in said socket, said sleeve being formed with a central opening communicating with a longitudinal slot through its wall and being adapted to receive said locking bolt, a plurality of rotatable tumblers on said sleeve, each tumbler having a disk portion positioned to engage the lugs of said locking bolts when the latter is in locking position and each being formed with a plurality of spaced apart indentations in its inner peripheral wall, each of said disk portions being provided with a radially extending notch in its wall adapted to register with a longitudinal slot in said sleeve when said tumbler is in adjusted position relative to the latter, and a spring pressed ball member carried by the sleeve for each tumbler and arranged to engage the indented portions of the inner wall of the tumbler to normally maintain the latter in adjusted positions.

WALDO A. RIGAL.